United States Patent
Brogniez et al.

(10) Patent No.: US 11,820,697 B2
(45) Date of Patent: Nov. 21, 2023

(54) METHOD FOR PRODUCING MINERAL FIBRES

(71) Applicant: SAINT-GOBAIN ISOVER, Courbevoie (FR)

(72) Inventors: Sébastien Brogniez, Levallois-Perret (FR); Guillaume Guery, Biarritz (FR)

(73) Assignee: SAINT-GOBAIN ISOVER, Courbevoie (FR)

(*) Notice: Subject to any disclaimer, the term of this patent is extended or adjusted under 35 U.S.C. 154(b) by 752 days.

(21) Appl. No.: 16/341,550

(22) PCT Filed: Oct. 12, 2017

(86) PCT No.: PCT/FR2017/052810
§ 371 (c)(1),
(2) Date: Apr. 12, 2019

(87) PCT Pub. No.: WO2018/069652
PCT Pub. Date: Apr. 19, 2018

(65) Prior Publication Data
US 2021/0331964 A1   Oct. 28, 2021

(30) Foreign Application Priority Data
Oct. 14, 2016   (FR) .................................... 1659948

(51) Int. Cl.
*C03B 37/04* (2006.01)
*D01D 5/18* (2006.01)
*D01D 7/02* (2006.01)

(52) U.S. Cl.
CPC ............. *C03B 37/045* (2013.01); *D01D 5/18* (2013.01); *D01D 7/02* (2013.01); *D10B 2101/06* (2013.01); *D10B 2401/20* (2013.01)

(58) Field of Classification Search
CPC .................................................. C03B 37/045
See application file for complete search history.

(56) References Cited

U.S. PATENT DOCUMENTS 3,304,164 A     2/1967   Charpentier et al.
4,058,386 A *  11/1977   Faulkner ............... C03B 37/048
                                                    65/460
(Continued)

FOREIGN PATENT DOCUMENTS

EP   0 091 381 A1   10/1983
FR   1 382 917 A    12/1964
(Continued)

OTHER PUBLICATIONS

Translation of KR 830001253B1 (Year: 1983).*
International Search Report as issued in International Patent Application No. PCT/FR2017/052810, dated Jan. 25, 2018.

*Primary Examiner* — Cynthia Szewczyk
(74) *Attorney, Agent, or Firm* — Pillsbury Winthrop Shaw Pittman LLP

(57) ABSTRACT

A process for forming mineral fibers by internal centrifugation using a device including a basket and a fiberizing spinner suitable for rotating jointly about an axis of rotation, the basket including an annular wall pierced by orifices and the fiberizing spinner including an annular wall pierced by orifices, the process including feeding the basket with material to be fiberized at a temperature $T_a$; centrifuging the material to be fiberized by joint rotation of the basket and of the fiberizing spinner. The factor F is greater than 2000, the factor F being defined by $F=\mu_a dN/Q$; wherein $\mu_a$ is the viscosity of the material to be fiberized at the temperature $T_a$; d is the distance between the annular walls of the basket and of the fiberizing spinner; N is the number of orifices of the basket; and Q is the feed flow rate of the material to be fiberized.

9 Claims, 1 Drawing Sheet

(56) References Cited

U.S. PATENT DOCUMENTS

| | | | | |
|---|---|---|---|---|
| 4,203,774 | A | * | 5/1980 | Battigelli ............... C03B 37/045 |
| | | | | 65/460 |
| 5,554,324 | A | * | 9/1996 | Bernard ................ C03B 37/045 |
| | | | | 264/8 |
| 6,158,249 | A | | 12/2000 | Battigelli et al. |
| 2011/0111198 | A1 | * | 5/2011 | Letourmy ............ D04H 1/4226 |
| | | | | 428/221 |
| 2011/0262749 | A1 | | 10/2011 | Sasaoka |

FOREIGN PATENT DOCUMENTS

| | | |
|---|---|---|
| FR | 2 779 713 A1 | 12/1999 |
| FR | 2 820 736 A1 | 8/2002 |
| FR | 2 854 626 A1 | 11/2004 |
| FR | 2 954 307 A1 | 6/2011 |
| JP | H06-503799 A | 4/1994 |
| JP | 2011-247410 A | 12/2011 |
| KR | 830001253 B1 * | 6/1983 |
| WO | WO 02/064520 A1 | 8/2002 |

\* cited by examiner

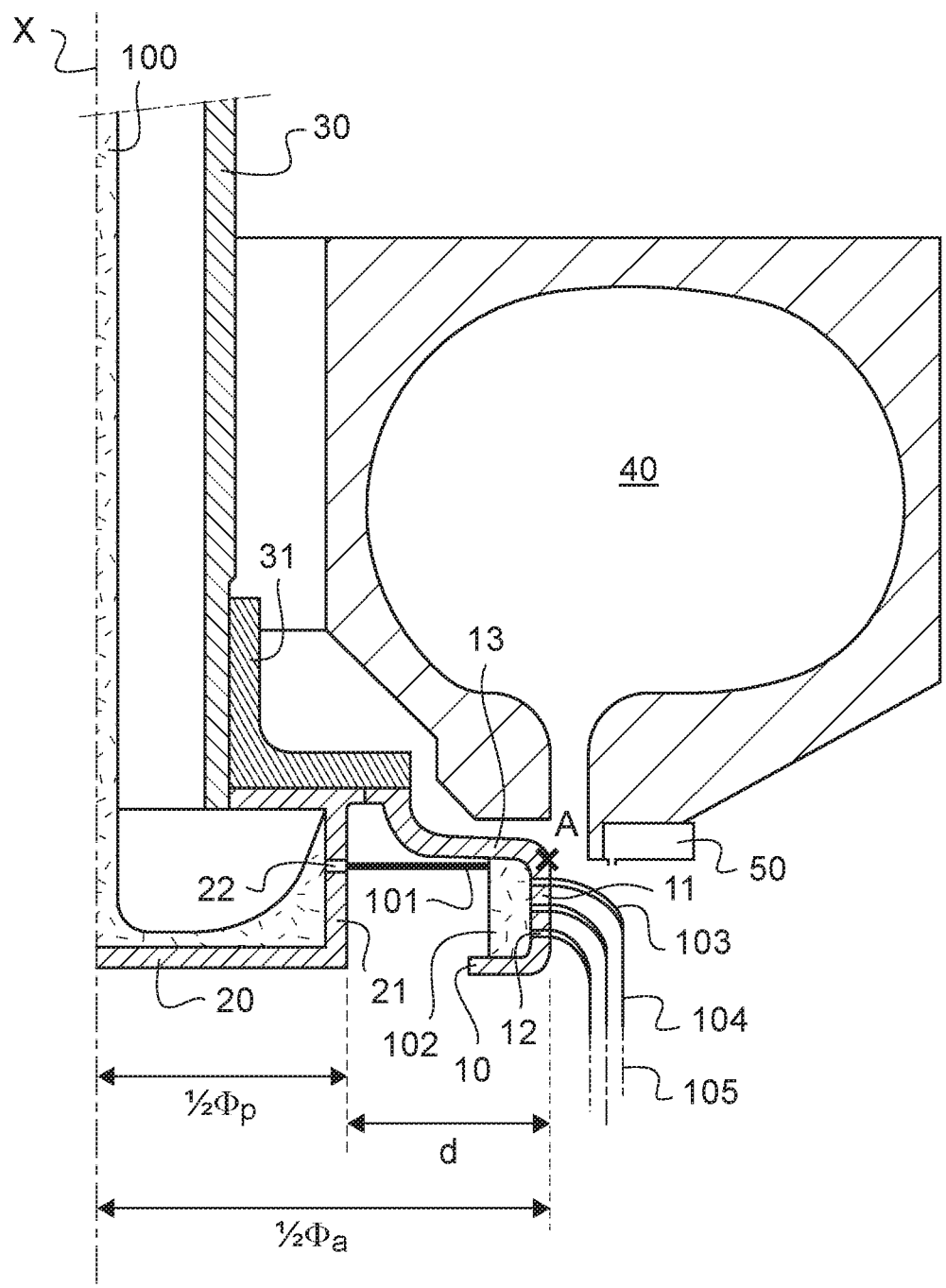

METHOD FOR PRODUCING MINERAL FIBRES

CROSS REFERENCE TO RELATED APPLICATIONS

This application is the U.S. National Stage of PCT/FR2017/052810, filed Oct. 12, 2017, which in turn claims priority to French Patent Application No. 1659948 filed Oct. 14, 2016, the entire contents of all applications are incorporated herein by reference in their entireties.

The invention relates to a process for forming mineral fibers by internal centrifugation, to a device particularly suitable for the implementation of this process, and also to mineral fibers that may be obtained by this process. The process according to the invention applies in particular to the industrial production of glass wool intended to be incorporated for example into the composition of thermal and/or acoustic insulation products.

A molten glass stream is introduced into a fiberizing spinner rotating at high speed and pierced at its periphery by a very large number of orifices through which the glass is projected in the form of filaments under the effect of the centrifugal force. These filaments are then subjected to the action of an annular high-temperature high-velocity attenuating stream which hugs the wall of the spinner, which stream attenuates said filaments and converts them into fibers. The fibers formed are entrained by this attenuating gas stream to a receiving device generally formed by a gas-permeable receiving and conveying belt. This process is referred to as "internal centrifugation".

This process has been the subject of numerous improvements, some of them relating in particular to the fiberizing spinner, others to the means for generating the annular attenuating stream.

Document FR 1382917 describes a fiberizing member whose principle is still widely used: the molten material is conveyed into a basket, the vertical wall of which comprises orifices through which the material is projected in the form of jets onto the inner wall of a fiberizing spinner which is attached to the basket and which comprises a large number of orifices. This wall is referred to as the "band" of the fiberizing spinner. In order to obtain good quality fiberizing, the orifices are distributed in annular rows and the diameters of the orifices vary according to the row to which they belong, this diameter decreasing from the top of the band to the lower part thereof. In operation, it is also necessary to keep a constant reserve of molten material inside the fiberizing spinner.

The applicant has noticed that bubbles were able to form in the molten material during the projection thereof from the basket to the fiberizing spinner. Depending on the fiberizing conditions, the bubbles that form at the location of the impact of the jets of molten material on the reserve inside the fiberizing spinner are capable of persisting and of being found in the fibers. The present invention aims to propose a fiberizing process that makes it possible to obtain a significant amount of bubbles in the fibers. The presence of bubbles in the fibers may be advantageous for modifying some of the properties thereof, for example the density thereof.

Thus, the present invention relates to a process for forming mineral fibers by internal centrifugation using a device comprising a basket and a fiberizing spinner which are suitable for rotating jointly about an axis of rotation, the basket comprising an annular wall pierced by a plurality of orifices and the fiberizing spinner comprising an annular wall pierced by a plurality of orifices, said process comprising:

feeding the basket with material to be fiberized at a temperature $T_a$;

centrifuging the material to be fiberized by joint rotation of the basket and of the fiberizing spinner, characterized in that the factor F is greater than 2000, the factor F being defined by $$F = \frac{\mu_a d N}{Q},$$

wherein:
$\mu_a$ is the viscosity, expressed in Pa·s, of the material to be fiberized at the temperature $T_a$;

d is the distance, expressed in m, between the annular wall of the basket and the annular wall of the fiberizing spinner;

N is the number of orifices of the basket; and

Q is the feed flow rate, expressed in kg/s, of the material to be fiberized.

The choice of a factor F of greater than 2000 makes it possible to obtain mineral fibers having a significant amount of bubbles. The higher the factor F, the higher the amount of bubbles in the fibers. Thus, for the purpose of obtaining a large amount of bubbles, the factor F is preferably greater than 5000, greater than 7000 or 10 000, or else greater than 15 000, or greater than 20 000, greater than 25 000, or even greater than 30 000.

The viscosity p of the material to be fiberized may be determined according to the Vogel-Fulcher-Tammann equation:

$$\text{Log}(\mu) = A + \frac{B}{T - C}$$

in which T is the temperature considered, and A, B and C are constants specific to the material considered, conventionally determined by a person skilled in the art by a regression starting from three pairs of measurements of p and T on the material considered. The viscosity $\mu_a$ at the feed temperature of the basket $T_a$ is generally from 50 to 150 Pa·s, preferably from 60 to 130 Pa·s.

The distance d between the annular wall of the basket and the annular wall of the fiberizing spinner is generally from 0.05 to 0.2 m. It is defined by half the difference between the diameter of the fiberizing spinner Øa and the diameter of the basket Øp. The diameters of the basket and of the fiberizing spinner are measured when the fiberizing device is shutdown. The diameter of the basket Øp is measured by considering the outermost point, relative to the axis of rotation, of its annular wall whilst the diameter of the fiberizing spinner Øa is measured by considering the highest point on the outer part of its annular wall. The fiberizing spinner generally has a diameter of from 200 to 800 mm, for example, around 200, 300, 400 or 600 mm. Depending on the size of the fiberizing spinner, the basket may have a diameter of from 70 to 400 mm, for example around 70, 200 or 300 mm. The ratio between the diameter of the fiberizing spinner and the diameter of the basket Øa/Øp is preferably greater than 2, or greater than 2.2 or even greater than 2.5.

The annular wall of the basket generally comprises from 50 to 1000 orifices, preferably from 100 to 900 orifices, more preferentially from 150 to 800 orifices. It is understood that only orifices useful during the operation of the fiberizing device are taken into account here, i.e. orifices through which a jet of material to be fiberized is actually formed between the basket and the fiberizing spinner. The orifices may be formed over one or more rows around the annular wall over the entire height of the annular wall, in particular over 2 to 6 rows, so as to uniformly distribute the material to be fiberized against the annular wall of the fiberizing spinner. They generally have a diameter of from 1.5 to 3 mm. The annular wall of the basket preferably comprises a linear density of orifices, i.e. the ratio between the number of orifices and the perimeter of the basket, of greater than 2 orifices/cm, preferably greater than 3 orifices/cm, or greater than 5 orifices/cm, or even greater than 7 orifices/cm.

The annular wall of the fiberizing spinner generally comprises 10 000 to 60 000 orifices. The number of orifices of the spinner will of course be adapted to the diameter thereof. These orifices generally have a diameter of from 0.5 to 1.5 mm. They are generally distributed in several rows along the annular wall. The orifices of the fiberizing spinner may have a constant diameter over the whole of the annular wall. The annular wall may also comprise several annular zones each comprising orifices of different diameters such as described for example in WO 02/064520.

The feed flow rate Q of the material to be fiberized in the basket is generally from 0.01 to 0.5 kg/s. The flow rate per orifice of the basket, that is to say the ratio Q/N, is preferably greater than 0.1 g/s, or greater than 0.8 g/s and may range up to 2 g/s. The feed flow rate of the material to be fiberized in the basket may be deduced from the output.

The basket and the fiberizing spinner generally rotate at a speed of 1000 to 4000 rpm.

The present invention also relates to a device for forming mineral fibers comprising a basket and a fiberizing spinner which are suitable for rotating jointly about an axis of rotation, the basket comprising an annular wall pierced by a plurality of orifices and the fiberizing spinner comprising an annular wall pierced by a plurality of orifices, characterized in that the annular wall of the basket comprises a linear density of orifices of greater than 5 orifices/cm, preferably greater than 7 orifices/cm.

Since the bubbles are generated during the impact of the jets originating from the basket on the reserve of molten material in the fiberizing spinner, it is indeed advantageous to increase, at constant flow rate, the number of jets formed at the basket. For this, the device according to the invention comprises a basket having a higher linear density of orifices, and therefore a higher number of orifices, then the basket conventionally used in order to favor the presence of bubbles in the mineral fibers. Thus, the annular wall of the basket may comprise for example 110 to 210 orifices for a basket having a diameter of 70 mm, 310 to 620 orifices for a basket having a diameter of 200 mm, or else 470 to 940 orifices for a basket having a diameter of 300 mm.

The orifices of the basket may conventionally have a diameter of from 1 to 4 mm. In one particular embodiment, the orifices of the basket have however a diameter smaller than those of the baskets conventionally used in order to counteract the effect that the increase in the number of orifices of the basket might have on the flow rate of material to be fiberized. For a conventional basket with a diameter of 70 mm and comprising 2*50 orifices, the orifices generally have a diameter of around 3 mm. Thus, in the device according to the invention, the diameters of the orifices of the basket advantageously have a diameter of from 1.2 to 2.9 mm, or from 1.5 to 2.5 mm. Other factors such as the viscosity of the material to be fiberized or else the centrifuging speed may however also make it possible to adapt the flow rate of material to be fiberized during the implementation of the process according to the invention, without necessarily reducing the diameter of the orifices of the basket.

The other features mentioned above regarding the basket and the fiberizing spinner obviously remain valid for the device according to the invention.

The device according to the invention generally comprises an annular burner generating a high-temperature attenuating gas jet as described above. It may also comprise a blowing ring positioned below the burner. The blowing ring makes it possible to prevent too large a dispersion of the fibers relative to the axis of rotation. The device may also comprise an induction ring and/or internal burner below the fiberizing spinner in order to heat the lowest zone of the fiberizing spinner and prevent or limit the creation of a temperature gradient over the height of the annular wall of the fiberizing spinner.

FIG. 1 represents a cross-sectional view of a device for forming mineral fibers according to the invention. The terms "high", "low", "top" and "bottom" are defined relative to the vertical axis when the device is in the centrifuging position, that is to say when the axis of rotation of the basket and of the fiberizing spinner is along a vertical axis, the material to be fiberized being fed via the top.

The device for forming mineral fibers comprises a fiberizing spinner 10, a basket 20 and a shaft 30 of axis X intended to be rotated by a motor (not represented). The shaft 30 is hollow. At its upper end, the shaft 30 is connected to means for supplying molten material to be fiberized. The fiberizing spinner 10 and a basket 20 are jointly fastened to the lower end of the shaft 30 via a hub 31. The fiberizing spinner 10 comprises an annular wall 11 pierced by a plurality of orifices 12 and a web 13. The web 13 forms the top of the fiberizing spinner 10, between the annular wall 10 and the hub 31. The diameter of the spinner Oa is defined by the distance between the axis X and the high point A on the outer part of the annular wall 11, that is to say at the shoulder between the web 13 and the annular wall 11. The basket 20 comprises an annular wall 21 pierced by a plurality of orifices 22. The diameter of the basket Op is defined by the distance between the axis X and the outermost point of the annular wall 21. The basket 20 is located on the inside of the fiberizing spinner 10. When the device for forming mineral fibers is in the fiberizing position, the axis X is vertical.

When the device according to the invention is in operation, the shaft 30, the fiberizing spinner 10 and the basket 20 are jointly rotated about the axis X. The molten material to be fiberized 100 flows into the shaft 30 from the feed means to the basket 20, in which it spreads out. Under the effect of the rotation, the molten material to be fiberized is projected onto the annular wall 21 of the basket 20, passes through the plurality of orifices 22 of the basket 20 and is projected onto the annular wall 11 of the fiberizing spinner 10 in the form of filaments 101. A permanent reserve of molten material to be fiberized 102 is then formed in the fiberizing spinner 10 for feeding the plurality of orifices 12 pierced in the annular wall 11 of the fiberizing spinner 10. The molten material to be fiberized passes through the plurality of orifices 12 of the fiberizing spinner 10 to form flow cones 103 which extend into pre-fibers 104, then into fibers 105.

The conditions of the process according to the invention favor the formation of bubbles in the material to be fiberized at the location of the impact of the filaments 101 with the reserve 102 present in the fiberizing spinner 10. The bubbles are generated in an amount and size that are sufficient for enabling the persistence thereof in the mineral fibers obtained.

The internal centrifugation device generally comprises an annular burner 40 generating a high-temperature attenuating gas jet. The annular burner has, as axis of symmetry, the axis of rotation X of the shaft 30. The outlet of the annular burner is located above the annular wall 11 of the fiberizing spinner 10, the attenuating gas jet being tangential to the annular wall 11 of the fiberizing spinner 10. The attenuating gas jet makes it possible to heat both the annular wall 11 of the fiberizing spinner 10 and the flow cones 103 that are formed at the outlet of the fiberizing spinner 10. Under the action of the attenuating gas jet of the annular burner 40, the pre-fibers 104 are attenuated, their end portion generating staple fibers 105 which are then collected below the fiberizing spinner 10.

The device for forming mineral fibers may also comprise a blowing ring 50 positioned below the burner 40. The blowing ring 50 has the effect of driving back the fibers 105 toward the axis X and thus preventing a dispersion of the fibers 105 too far from the axis X.

The composition of the material to be fiberized is not particularly limited as long as it can be fiberized by an internal centrifugation process. It may vary on the basis of the properties desired for the mineral fibers produced, for example the biosolubility, fire resistance or thermal insulation properties. The material to be fiberized is preferably a soda-lime borosilicate glass composition. It may have in particular a composition that contains the constituents below, in the weight proportions defined by the following limits:

| | |
|---|---|
| $SiO_2$ | 35 to 80%, |
| $Al_2O_3$ | 0 to 30%, |
| CaO + MgO | 2 to 35%, |
| $Na_2O + K_2O$ | 0 to 20%, | it being understood that in general, $SiO_2+Al_2O_3$ is within the range extending from 50 to 80% by weight and that $Na_2O+K_2O+B_2O_3$ is within the range extending from 5 to 30% by weight.

The material to be fiberized may in particular have the following composition:

| | |
|---|---|
| $SiO_2$ | 50 to 75%, |
| $Al_2O_3$ | 0 to 8%, |
| CaO + MgO | 2 to 20%, |
| $Fe_2O_3$ | 0 to 3%, |
| $Na_2O + K_2O$ | 12 to 20%, |
| $B_2O_3$ | 2 to 10%; | or else the following composition:

| | |
|---|---|
| $SiO_2$ | 35 to 60%, |
| $Al_2O_3$ | 10 to 30%, |
| CaO + MgO | 10 to 35%, |
| $Fe_2O_3$ | 2 to 10%, |
| $Na_2O + K_2O$ | 0 to 20%. |

The material to be fiberized may be produced from pure constituents, but is also obtained by melting a mixture of natural raw materials that introduce various impurities.

The material to be fiberized according to the invention preferably has the following properties:

the temperature corresponding to a viscosity of 100 Pa·s (T log 3) of below 1200° C., or below 1150° C., preferably between 1020° C. and 1100° C., or between 1050° C. and 1080° C.; and a liquidus temperature (T liquidus) such that the difference between T log 3 and T liquidus is greater than 50° C., in particular a liquidus temperature of from 870° C., or 900° C., to 950° C.

The feed temperature $T_a$ of the material to be fiberized at the inlet of the shaft 30 may vary from 1000° C. to 1550° C. It may depend on numerous parameters, in particular on the nature of the material to be fiberized and on the characteristics of the fiberizing device. The temperature $T_a$ is generally of the order of from 1000° C. to 1200° C., preferably 1020° C. to 1100° C.

The process for forming mineral fibers according to the invention and the device for forming mineral fibers according to the invention make it possible to obtain mineral fibers having a significant amount of bubbles. The bubbles present in the mineral fibers may be quantified by a light scattering measurement. Thus, the present invention also relates to mineral fibers, in particular to mineral wool, having a light scattering LS of greater than 0.4, preferably of greater than 0.5, more preferentially of greater than 0.6. The light scattering LS of the mineral fibers is determined by measurement of the luminous intensity scattered by the mineral fibers placed in a spectrophotometer cuvette filled with an index liquid. The measurement protocol is the following:

Principle

A 10 mm*10 mm*40 mm cuvette is illuminated via a first lateral side using an LED spotlight and a photo is taken on a black background on a lateral side of the cuvette perpendicular to the first side, over a determined exposure time. The exposure time, which is identical for all the samples, is chosen so that the detector is never saturated.

The median of the luminous intensities of the pixels over a zone of 7 mm*28 mm defined at 1.5 mm from the edges of the cuvette and 3 mm from the bottom of the cuvette is then measured by image analysis.

Calibration in order to calibrate the measurements, two reference points are measured for a cuvette containing solely an index liquid (dimethyl phthalate) and for a cuvette containing milk diluted 100 times in water.

Measurement

A sample of 400 mg of virgin mineral binder fibers is introduced into a cuvette filled with the index liquid. Once the median of the luminous intensity has been measured, the light scattering for this sample is calculated according to the following formula:

$$LS(\text{sample}) = \frac{I(\text{sample}) - I(\text{index liquid})}{I(\text{sample}) - I(\text{milk})}$$

in which (sample), I(index liquid) and I(milk) are the medians of the intensities respectively of the sample, of the index liquid and of the milk diluted 100 times. The light scattering LS of given mineral fibers corresponds to the average of the light scatterings measured for at least 6 samples of these fibers.

The mineral fibers according to the invention preferably have a composition as defined above for the material to be fiberized.

Lastly, the invention also relates to thermal and/or acoustic insulation products comprising mineral fibers according to the invention, obtained by the process for forming mineral fibers according to the invention or with the aid of the device for forming mineral fibers according to the invention.

The invention is illustrated using the following nonlimiting examples.

EXAMPLES

The reference example (Ref.), the comparative examples (C1 and C2) and examples 1 and 2 according to the invention were produced with a material to be fiberized having the following composition, in weight percentages:

| | |
|---|---|
| SiO$_2$ | 65.3% |
| Al$_2$O$_3$ | 2.1% |
| CaO | 8.1% |
| MgO | 2.4% |
| Na$_2$O | 16.4% |
| K$_2$O | 0.7% |
| B$_2$O$_3$ | 4.5% |

The features of the fiberizing device used and also the fiberizing conditions are described in detail in table 1 below.

For the reference example, the fiberizing device used is a device without a basket comprising a fiberizing spinner with a bottom. The fibers obtained do not therefore comprise bubbles. For examples C1, 1 and 2, the fiberizing device used is identical except for the basket which has a larger number of holes for examples 1 and 2 compared to comparative example C1 which uses a conventional basket.

TABLE 1

| | Ref. | C1 | Ex. 1 | Ex. 2 |
|---|---|---|---|---|
| Flow rate (kg/s) | 0.23 | 0.23 | 0.23 | 0.23 |
| T$_a$ (°C.) | 1036 | 1036 | 1036 | 1036 |
| μ$_a$ (Pa · s) | 147 | 147 | 147 | 147 |
| Basket: | | | | |
| Diameter (mm) | — | 200 | 200 | 200 |
| Number of orifices | | 30 | 240 | 600 |
| Orifice diameter (mm) | | 5.0 | 2.9 | 2.3 |
| Fiberizing spinner: | | | | |
| Diameter (mm) | 400 | 400 | 400 | 400 |
| Number of orifices | 30270 | 30270 | 30270 | 30270 |
| Orifice diameter (mm) | 0.7 | 0.7 | 0.7 | 0.7 |
| Annular burner: | | | | |
| Temperature (°C.) | 1300 | 1300 | 1300 | 1300 |
| Induction ring: | | | | |
| Power (kW) | 20 | 20 | 20 | 20 |
| F | — | 1900 | 15250 | 38120 |

The light scatterings of the fibers thus obtained were measured as described above and are presented in table 2 below:

TABLE 2

| Fiber | Ref. | C1 | Ex. 1 | Ex. 2 |
|---|---|---|---|---|
| LS | 0.13 | 0.30 | 0.53 | 0.71 |

The fibers from examples 1 and 2 have a light scattering which is much greater than that of the reference fibers and fibers from comparative example C1, which demonstrates the presence of bubbles in the fibers from examples 1 and 2.

The invention claimed is:

1. A process for forming mineral wool by internal centrifugation using a device comprising a basket and a fiberizing spinner which are suitable for rotating jointly about an axis of rotation, the basket comprising an annular wall pierced by a plurality of orifices and the fiberizing spinner comprising an annular wall pierced by a plurality of orifices, said process comprising:
feeding the basket with material to be fiberized at a temperature T$_a$;
centrifuging the material to be fiberized by joint rotation of the basket and of the fiberizing spinner,
wherein a factor F is greater than 2000, the factor F being defined by $$F = \frac{\mu_a dN}{Q},$$

wherein:
μ$_a$ is the viscosity, expressed in Pa·s, of the material to be fiberized at the temperature T$_a$;
d is the distance, expressed in m, between the annular wall of the basket and the annular wall of the fiberizing spinner;
N is the number of orifices of the basket; and
Q is the feed flow rate, expressed in kg/s, of the material to be fiberized, and
wherein the annular wall of the basket comprises from 220 to 1,000 orifices.

2. The process as claimed in claim 1, wherein the viscosity of the material to be fiberized at the temperature T$_a$ is from 50 to 150 Pa·s.

3. The process as claimed in claim 1, wherein the distance between the annular wall of the basket and the annular wall of the fiberizing spinner is from 0.05 to 0.2 m.

4. The process as claimed in claim 1, wherein the feed flow rate of the material to be fiberized is from 0.01 to 0.5 kg/s.

5. The process as claimed in claim 1, wherein the material to be fiberized comprises the constituents below, in the weight proportions defined by the following limits:

| | |
|---|---|
| SiO$_2$ | 35 to 80%, |
| Al$_2$O$_3$ | 0 to 30%, |
| CaO + MgO | 2 to 35%, |
| Na$_2$O + K$_2$O | 0 to 20%. |

6. The process as claimed in claim 5, wherein the material to be fiberized is fed into the basket at a temperature of from 1000 to 1550° C.

7. The process as claimed in claim 1, wherein the factor F is greater than 5000.

8. The process as claimed in claim 7, wherein the factor F is greater than 10000.

9. A process for forming mineral wool by internal centrifugation using a device comprising a basket and a fiberizing spinner which are suitable for rotating jointly about an axis of rotation, the basket comprising an annular wall pierced by a plurality of orifices and the fiberizing spinner comprising an annular wall pierced by a plurality of orifices, said process comprising:
feeding the basket with material to be fiberized at a temperature T$_a$;
centrifuging the material to be fiberized by joint rotation of the basket and of the fiberizing spinner, wherein a factor F is greater than 2000, the factor F being defined by $F=\mu_a dN/Q$, wherein:

$\mu_a$ is the viscosity, expressed in Pa·s, of the material to be fiberized at the temperature $T_a$;

d is the distance, expressed in m, between the annular wall of the basket and the annular wall of the fiberizing spinner;

N is the number of orifices of the basket; and

Q is the feed flow rate, expressed in kg/s, of the material to be fiberized, wherein the orifices of the annular wall of the basket have a diameter of from 1.5 to 3 mm, and wherein the annular wall of the basket comprises from 220 to 1,000 orifices.

* * * * *